Figure 5:
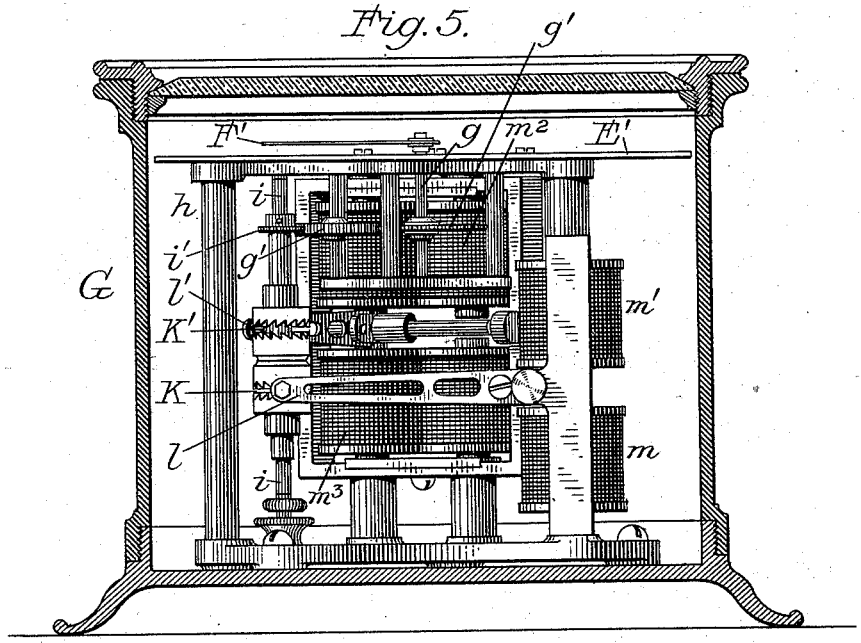

(No Model.) 6 Sheets—Sheet 1.
G. E. PAINTER.
AUTOMATIC ELECTRIC INDICATOR SYSTEM.
No. 559,038. Patented Apr. 28, 1896.
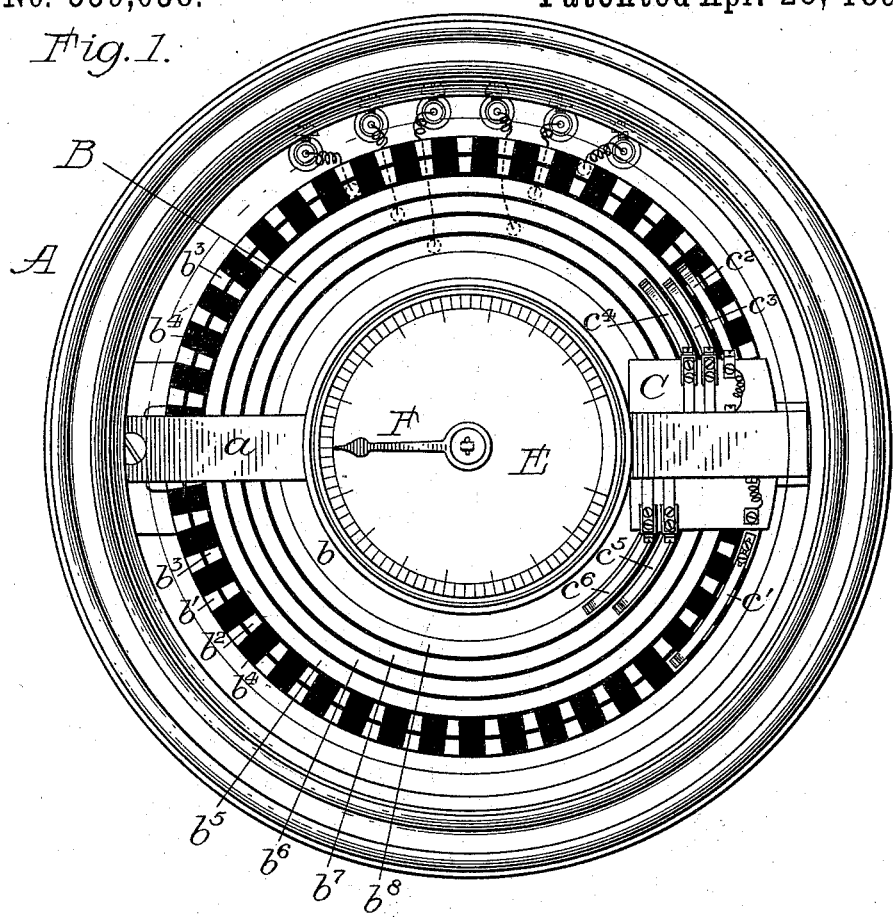
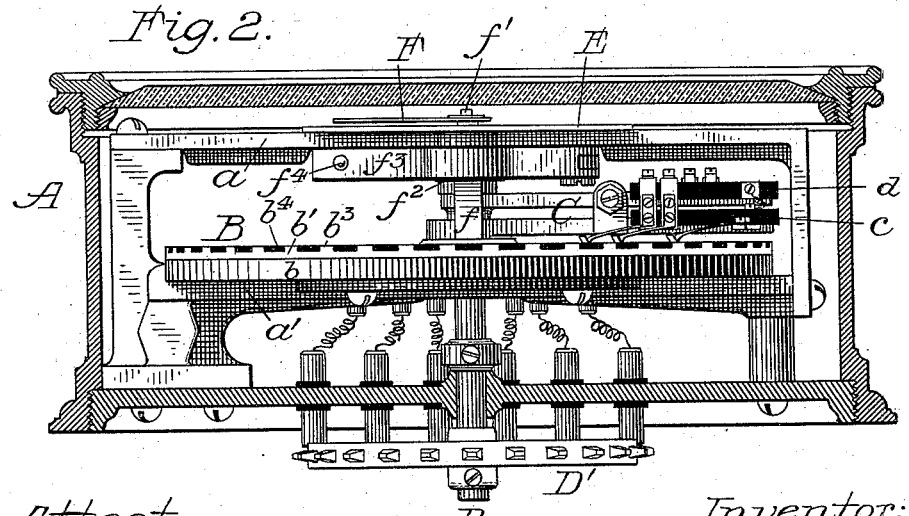

(No Model.) 6 Sheets—Sheet 2.
G. E. PAINTER.
AUTOMATIC ELECTRIC INDICATOR SYSTEM.
No. 559,038. Patented Apr. 28, 1896.
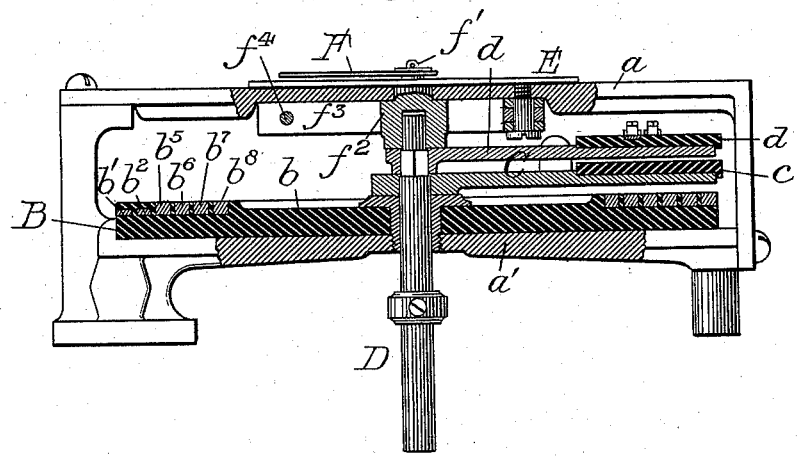
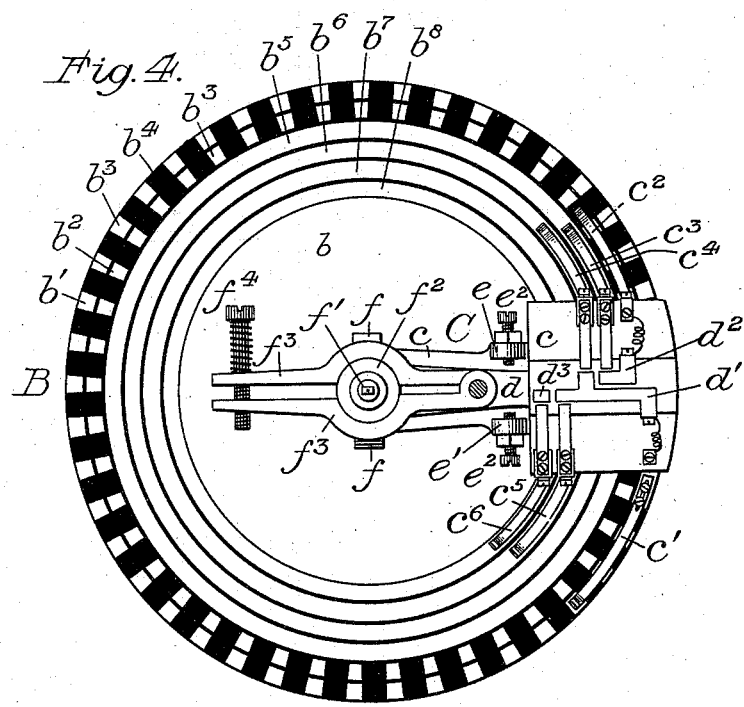

(No Model.)   6 Sheets—Sheet 3.

G. E. PAINTER.
AUTOMATIC ELECTRIC INDICATOR SYSTEM.

No. 559,038.   Patented Apr. 28, 1896.

(No Model.)  6 Sheets—Sheet 4.

G. E. PAINTER.
AUTOMATIC ELECTRIC INDICATOR SYSTEM.

No. 559,038. Patented Apr. 28, 1896.

Attest:
Howell Bartle
Emma E. Marks

Inventor:
Gwynne Ernest Painter.
By McElroy
Attorney.

(No Model.) 6 Sheets—Sheet 5.

G. E. PAINTER.
AUTOMATIC ELECTRIC INDICATOR SYSTEM.

No. 559,038. Patented Apr. 28, 1896.

Attest:
Howell Battle
Emma E. Marks

Inventor:
Gwynne Ernest Painter.
By
Attorney

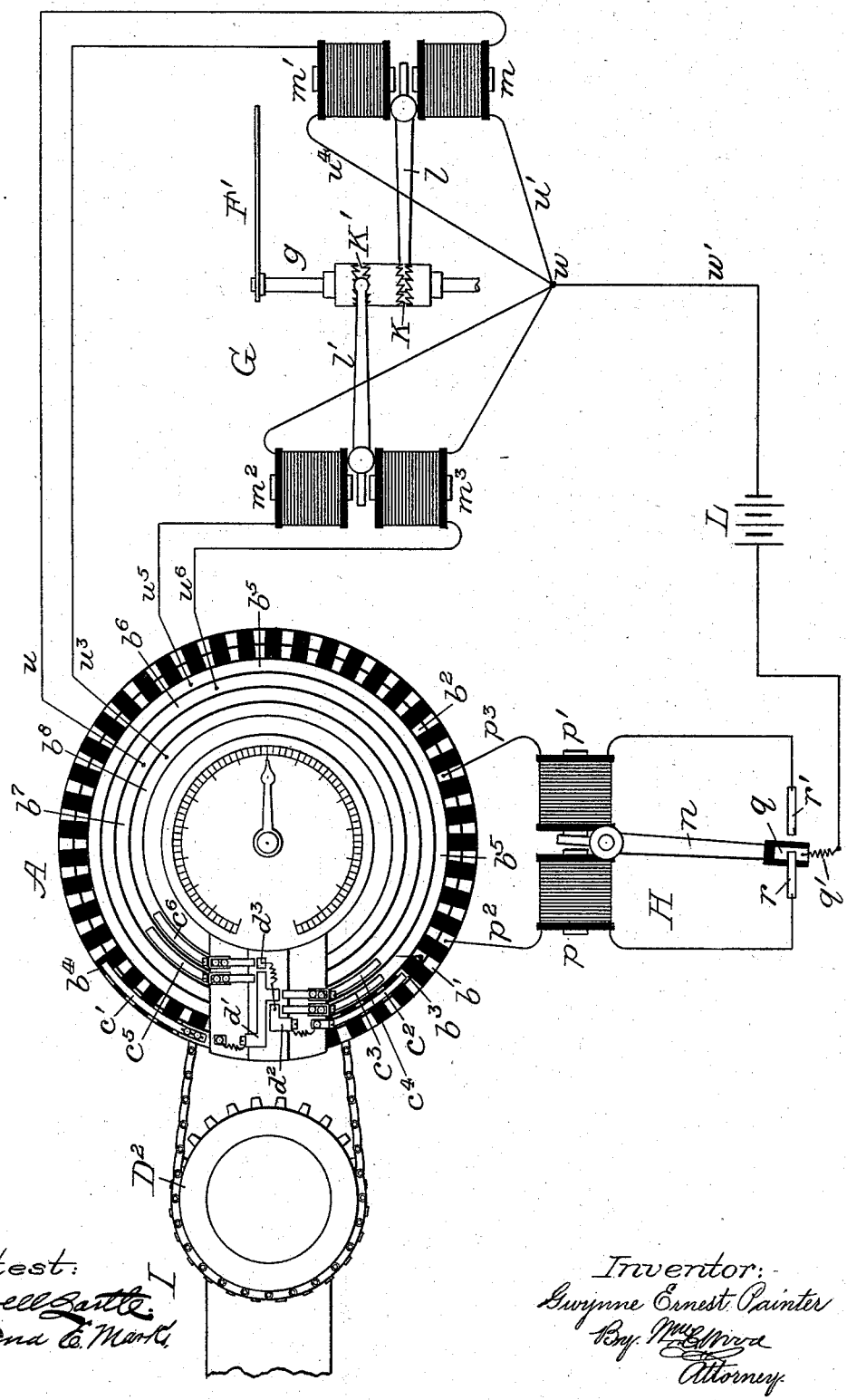

UNITED STATES PATENT OFFICE.

GWYNNE ERNEST PAINTER, OF BALTIMORE, MARYLAND.

AUTOMATIC ELECTRIC INDICATOR SYSTEM.

SPECIFICATION forming part of Letters Patent No. 559,038, dated April 28, 1896.

Application filed February 26, 1895. Renewed November 1, 1895. Serial No. 567,656. (No model.)

*To all whom it may concern:*

Be it known that I, GWYNNE ERNEST PAINTER, of the city of Baltimore, in the State of Maryland, have invented certain new and useful Improvements in Automatic Electric Indicator or Signaling Systems; and I do hereby declare that the following specification, taken in connection with the drawings furnished and forming a part of the same, is a clear, true, and complete description of my invention.

My said improvements pertain to that general class of automatic electric indicator systems which, under various names, have been devised for indicating at one or more instruments the precise extent of mechanical motion at an electrically-coupled distant instrument, regardless of the character of the source of power upon which said motion depends or the special service intended—as, for instance, when used upon ships for indicating at the pilot-house and also, perhaps, at various other parts of the vessel, the exact position of the rudder; also, when used upon the land for indicating at one or more distant points the rise and fall of water in mines and reservoirs or the contents of tanks for water and oil, and especially for pipe-lines; also, for indicating the direction of the wind, as well as for many other lines of service involving more or less similar conditions. In each of said (and similar) lines of service a mechanically-actuated shaft is necessarily involved—as, for instance, a rudder-head actuated from a steam steering-machine or a steering-wheel, or a shaft axially moved by a weight and controlled by a float or actuated by a wind-vane— and such a shaft must be relied upon for imparting the mechanical motion which, in its various interpretations, is to be automatically transmitted from a local electric organization to one or more distant receiving organizations or indicators adapted to impart the information desired.

The objects of my invention are to secure reliable service and also to provide durable transmitting and indicating instruments which can be constructed and installed at reasonable cost, and also to provide an automatic circuit-breaker for automatically controlling the line-batteries so as to restrict their operation to such times as they are actually required in transmitting the movements to be indicated.

In a contemporaneous application for patent (filed February 16, 1895, Serial No. 538,687) I have disclosed many features of invention which have been embodied in the apparatus herein disclosed, and it is to be understood that the features which constitute the subject of the present application have been devised with special reference to signaling apparatus which is automatically controlled by mechanism which is mechanically actuated for any given purpose.

After describing a complete apparatus in detail, as illustrated in the drawings, and indicating its mode of operation, the features deemed novel and appropriate to this application will be duly specified in the several clauses of claim hereunto annexed.

Figure 6:
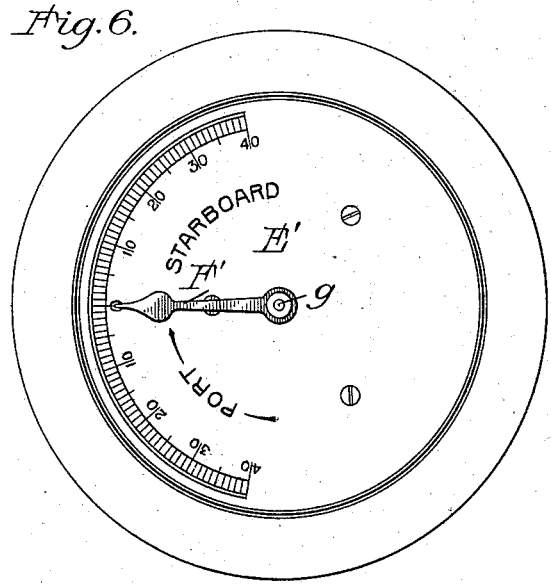
Figure 7:
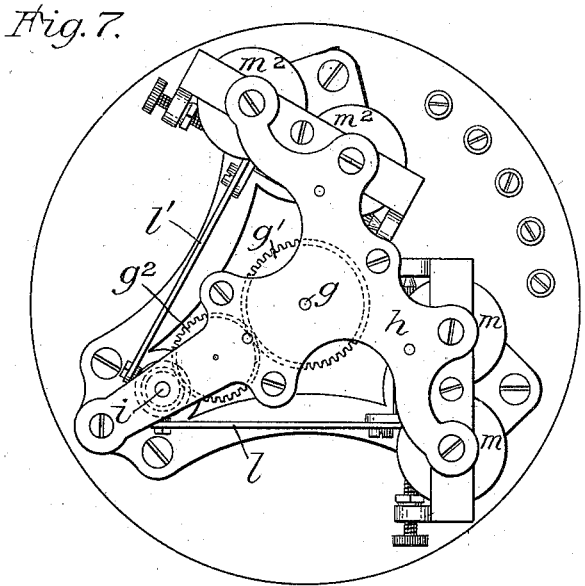
Figure 8:
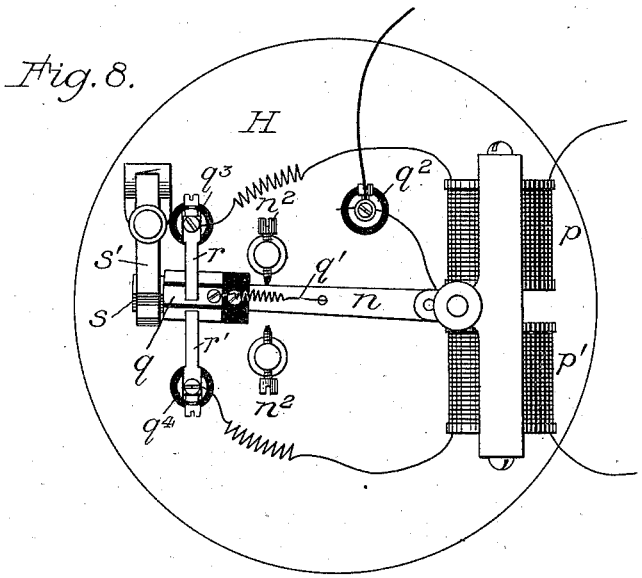
Figure 9:
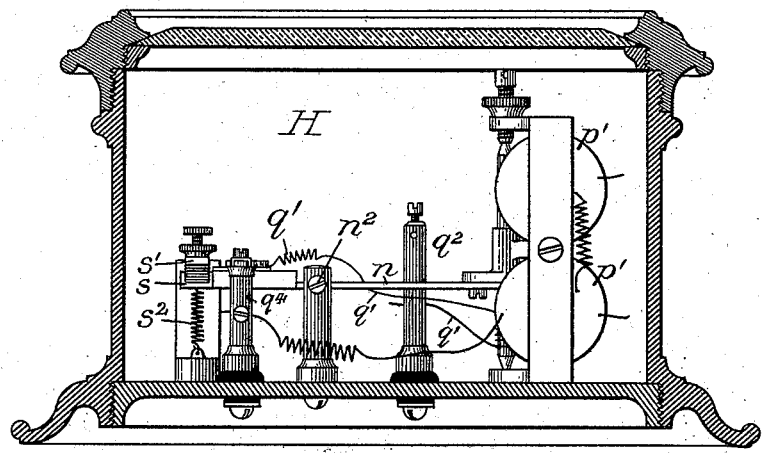
Figure 10:
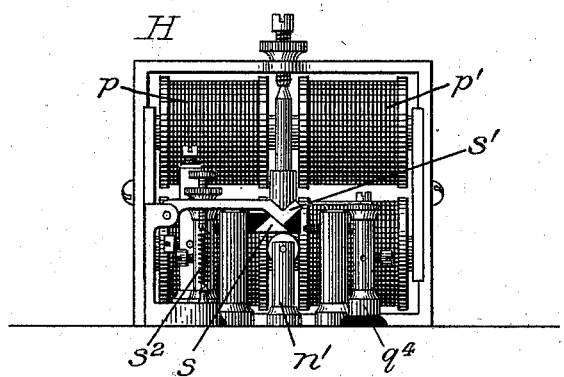

Referring to the drawings, Figures 1 and 2, in top and side view with partial section, respectively illustrate the electric switching organization, which is mechanically actuated by being coupled to any mechanically-actuated shaft or its equivalent. Fig. 3 is a vertical central section of the switch and through the switch-arm. Fig. 4 is a top view of the switch-plate and brush-arm. Fig. 5 illustrates in side elevation the magneto-mechanical organization which constitutes the indicator, the same being within a suitable casing, shown in vertical central section. Fig. 6 is a top view of the indicator-dial and its pointer. Fig. 7 is a plan view of the indicator below its dial. Figs. 8, 9, and 10 illustrate the automatic circuit-breaker respectively in top, side, and front views. Fig. 11 diagrammatically illustrates the entire apparatus with its electric connections and its mechanical connection with the stem of a rudder.

The electric switching organization A, Figs. 1, 2, 3, 4, and 11, embodies a circular switchboard or composite switch-plate B, supported in a frame affording upper and lower parallel bars $a$ and $a'$ and a brush-arm C, both of which involve features not present in the corresponding portion of my disclosures in my aforesaid application.

The switch-plate B includes, with an insulated base $b$, separate annular concentric plates $b'$ and $b^2$, each having contact-surfaces $b^3$ and comparatively wide intervening spaces $b^4$, suitably insulated. Within these plates there are four separate annular continuous-surfaced concentric plates $b^5$, $b^6$, $b^7$, and $b^8$, this latter being the inner or smallest, and all of said plates are suitably insulated from each other, and each at the under side has a suitable binding-post. The plate, as a whole, is appropriately mounted within a suitable casing.

The brush-arm C is a complex structure, including a main arm $c$ and an auxiliary arm $d$, which overlies the main arm and is capable of a limited swinging movement independently of the main arm, which, with the mode of mounting them on their working shaft D, will be hereinafter fully described.

The main arm $c$ carries at one side a brush $c'$, which sweeps over the break-wheel or broken contact-plate $b'$, and at the other side an oppositely-projecting brush $c^2$, which sweeps over the broken contact-plate $b^2$, their arrangement being such that when either brush is on metallic contact the other has a bearing upon the intervening insulation. Alongside of the brush $c^2$ there are two other brushes $c^3$ and $c^4$, which bear upon the continuous-surfaced annular plates $b^5$ and $b^6$, and at the opposite side of the arm there are two similar brushes $c^5 c^6$, which bear, respectively, upon the annular plates $b^7$ and $b^8$.

Each of the brushes, except $c'$ and $c^2$, have brush-acting heel-pieces which overhang the auxiliary arm $d$, and, as these may be integral with the brushes or detachably connected thereto, they are not separately designated by letters of reference, it being understood that each of said brushes is centrally attached to a post and that each is a double brush for doing duty at both of its ends.

The auxiliary brush-arm $d$ carries at its outer end three shifting contact-plates for appropriately coupling the brushes. The large contact-plate $d'$ is permanently coupled to the brush $c'$ by means of a spiral conductor, as shown. The smaller contact-plate $d^2$ is similarly connected with the brush $c^2$, and the smallest contact-plate $d^3$ is electrically coupled with the plate $d^2$ by a subconductor. (Not shown, but clearly indicated as a spiral conductor in Fig. 11.) It will now be seen, when the auxiliary arm is moved, say, toward the right hand, that the brushes $c'$ and $c^2$ will be electrically coupled separately to appropriate brushes—i. e., from $c'$ by way of contact-plate $d'$ to brush $c^5$, and from $c^2$ by way of the coiled conductor, the plate $d^2$, and the subconductor to contact-plate $d^3$ and thence to brush $c^6$; also, that when the auxiliary arm is moved toward the left hand the brush $c^2$ will be coupled to brush $c^3$ by way of plate $d^2$, and brush $c'$, by way of plate $d'$, will be coupled to the brush $c^4$, so that, according to the direction of the movement of the switch-arm, the brushes $c^3 c^4$ and $c^5 c^6$ will be either in or out of service.

The auxiliary brush-arm $d$ is restricted in its independent movement by means of two lugs $e\ e'$ on the main arm, provided with adjusting-screws $e^2$, against the ends of which the sides of the auxiliary arm engage, each of said screws having a lock-nut for preventing displacement. (All clearly shown in Fig. 4.)

The brush or switch arm C, as a whole, is operatively coupled to the working shaft D by a rigid connection with the auxiliary brush-arm $d$, which, after its independent movement, carries the main arm with it.

The shank of the main arm is provided with a yoke $f$, (which may be attached or integral,) having an axial stem or hub $f'$, which is freely journaled in the cap-bar $a$ of the frame and projects through it and through a dial E on said bar and carries a pointer F. This dial and pointer are needed mainly for the initial adjustment of the switch and for occasional inspection, the inscription being appropriate for signaling the position of a ship's rudder. On the hub $f'$ there is a collar $f^2$, and this is frictionally clamped between two yoke-jaws at $f^3$, hinged at one end to the under side of the frame-bar $a$ and at the other end adjustably coupled by a clamp-screw $f^4$, on which there is a spiral spring adjustably compressed between the head of the screw and the coincident surface of the adjacent jaw. This arrangement provides for frictionally holding the main brush-arm against any movement, except when actuated by the working shaft D through the auxiliary arm $d$.

On the working shaft D there is a chain-wheel D', through which power is applied from the source of motion, as will be hereinafter further explained, together with a description of the electrical operation of the switch. It may, however, be proper to here state that the two broken contact-plates $b'$ and $b^2$, so far as signaling is concerned, might be consolidated into one plate with both of the brushes $c'$ and $c^2$ coöperating therewith, but that the two plates are required for enabling the circuit to be wholly broken (and the generator cut out) at the close of every working movement of the switch, as will be hereinafter fully indicated.

The indicator organization G, (shown in Figs. 5 to 7, inclusive,) except as to the arrangement of its parts and the inscription on the dial, embodies no novel features which are not disclosed in my aforesaid application, and it is to be understood that I claim the same herein only as an element in appropriate combination with the switching organization described in an automatic signaling system.

The dial E' is substantially a counterpart of the dial E at the switch, and being suited for indicating the position of a ship's rudder it is inscribed "Starboard" and "Port," with a zero-mark corresponding to the right-line position of the rudder. At either side there are graduation-marks suitably numbered, indicating degrees of inclination to port or starboard.

The pointer F' is carried on a spindle $g$, suitably mounted in top of the frame $h$ and rotatively coupled to a driving-shaft $i$ by means of a pinion $g'$ on the spindle $g$, an idler-pinion $g^2$, and a pinion $i'$ on the shaft $i$.

The driving-shaft $i$ has a step-by-step movement and the gearing is such that the pointer marks one degree at each step movement. On the shaft $i$ there are wheels or drums affording two cam-slots K and K', which have inclined working faces and intervening stop-faces, as clearly indicated, the working faces of either slot being reversed to the other in matter of inclination to provide for opposite rotation. Two armature-levers $l$ and $l'$ are operatively connected with the shaft $i$ by means of studs or pins which project laterally into the cam-slots, so that when either lever is forcibly vibrated the shaft $i$ will be rotated step by step in an appropriate direction at each vibration of the lever.

The armature-lever $l$ is actuated by two magnets $m$ and $m'$, which alternate in their action in moving said lever first in one and then in the opposite direction for moving the pointer in one direction, and two other magnets $m^2$ and $m^3$ similarly actuate the armature-lever $l'$ for moving the pointer in the opposite direction, each magnet having its own circuit and each two coöperating magnets having circuits independent of the other two.

Should the source of working current be a dynamo it will not be so important to provide for cutting out the current when signaling is not required, as when a battery-current is relied upon, and therefore I do not restrict certain features of my invention to the employment of an automatic circuit-breaker in my apparatus.

In an electric signaling system wherein the switch is operated by hand, as disclosed in my aforesaid application, the cutting out of a battery or other generator is effected by means of an auxiliary arm, which is spring-mounted and capable in itself of retiring from a contact position to a cut-out position as soon as the operator's hand is removed from the switch; but in an automatic system the mechanical forces which actuate the switch are constant, and hence they securely hold the switch at any position to which it may have been actuated, and for that reason I employ an automatic circuit-breaker H. (Shown in Figs. 8 to 10, inclusive.) Considered as an automatic electromagnetic switch, this circuit-breaker involves novelty in the construction of the detent or tripping device, which accelerates the armature-lever $n$ during its closing movements and confines it against vibration, except when actuated by its magnets.

The lever $n$ has its armature properly located between the poles of the two magnets $p$ and $p'$, and it has a roller-support on a post at $n'$ and stop-screws $n^2$ $n^2$ for limiting its lateral vibrative movements. At its outer end it is provided with an insulating-block, carrying a centrally-located contact-plate $q$, coupled by a conductor $q'$ with a binding-post $q^2$, said conductor extending to and around the axis of the lever and thence to said post, with which the generator line-wire is to be coupled. One terminal conductor of the coil of magnet $p$ is coupled to a post $q^3$, carrying at its top a spring-brush $r$, which overlies the armature-lever, and a similar brush $r'$ is mounted upon an opposite post $q^4$, which is in turn connected with one terminal of the coil of the other magnet. The other two terminals of the other magnet-coils are coupled with the main switch, as will be hereinafter described. At the outer end of the armature-lever there is a hard-surfaced shoe $s$, (preferably metal,) having two inclined sides with which a detent-arm $s'$, having reversely-inclined faces, is in engaging-contact. One inclined face of the arm is always in contact with the appropriate inclined face of the lever, according to the direction in which said lever has last been actuated by its magnets. The arm $s'$ at its other end is pivoted to a post and is provided with an adjustable retractile spring $s^2$. This detent or tripping device is reliable in its action and responds readily to such making and breaking of contacts as are involved in the use of the break-plates $b'$ and $b^2$ of the switching organization at A. The contact-plate $q$ on the armature-lever, when the latter is at rest, is always in contact with the brush of the terminal of the magnet which is to be next excited, and hence the armature of the lever is in a proper position to be actuated by said magnet.

Should the arm $s'$ be sufficiently heavy, gravity would cause it to operate as described, but it would be more liable to displacement by shocks and jars than when controlled by a spring. If desired, either the arms or the lever may be provided with an antifriction-roll at the apex of the inclined faces for facilitating prompt passing of centers, but I have experienced no difficulties while relying upon the construction shown.

It is to be understood, regardless of the construction of the circuit-breaker, that its combination with a switch embodying two broken contact-plates and appropriate brushes constitutes a feature of my invention.

Referring now to Fig. 11, it will be understood that a ship's rudder at I has on its stem or head a chain-wheel $D^2$, coupled by a chain with the pulley or wheel D' on the working shaft D of the switching organization A. The indicator organization at G with the pointer F', its spindle $g$, and the two cam-slots K and K' are here shown without any gearing, it being sometimes desirable to mount the pointer directly on said shaft. The armature-levers $l$ and $l'$ and their magnets $m$ $m'$ and $m^2$ $m^3$ are arranged as previously described.

The circuit-breaker H, with its lever $n$, contact-plate $q$, magnets $p$ and $p'$, and brushes $r$ $r'$ are here shown, and it will be seen that one terminal $p^2$ of the coil of magnet $p$ is connected with the outer broken contact-plate $b'$ of the main switch, and that the inner broken contact-plate $b^2$ is connected with the coil of the magnet $p'$ by the terminal $p^3$, and that the armature-lever conductor $q'$ is connected with one pole of the battery L. The armature-lever $n$ of the circuit-breaker is here shown to have been last actuated by the magnet $p'$, and hence the latter is cut out and the current can next traverse the coil of the magnet $p$ to the plate $b'$ of the main switch, wherein under these conditions the brush $c'$ must be bearing upon an insulated surface $b^4$, while the other brush, $c^2$, is bearing upon a contact-surface $b^3$ of the then cut out broken contact-plate $b^2$. Should the brushes of the main switch be now turned by the rudder I toward the right hand, for instance, during its movement, the lever $l$ of the indicator G would be forcibly reciprocated by its magnets, say, first, by establishing a circuit by way of plate $b'$, main brush $c'$, auxiliary switch-arm plate $d'$, brush $c^5$, to switch-plate $b^7$, via conductor $u$ to coil of magnet $m$, thence by conductor $u'$ to post $w$ and conductor $w'$ to battery, and by exciting the magnet $p$ of the circuit-breaker this impulse not only actuates the indicator armature-lever and pointer one step in one direction, but also shifts the armature of the circuit-breaker. The broken contact-plate $b^2$ will enable the brush $c^2$ to next establish a circuit from said plate and brush to the contact-plate $d^3$, brush $c^6$, annular plate $b^8$, conductor $u^3$, through the coil of magnet $m'$, out on conductor $u^4$ to post $w$, thence by conductor $w'$ to the battery and circuit-breaker. This impulse will actuate the lever $l$ in the opposite direction, but continue the step movement of the pointer in its old direction, and, by exciting the magnet $p'$, will shift the connection from that magnet and broken contact-plate $b'$ to the magnet $p$ and broken contact-plate $b^2$, the insulation of this latter then supporting the brush $c^2$. So long as the movement of the main switch-arm continues in that direction, the step-by-step movement of the pointer will be continued in the appropriate direction, and at the close of each step the circuit will be wholly broken, and in whatever position the switch-arm may be allowed to rest the battery or other generator will be always cut out. Now when the rudder is moved in the opposite direction the indicator-pointer F' promptly responds, it being then actuated by the armature-lever $l'$ and its magnets, the latter being excited by way of circuits as follows: from broken contact-plate $b^2$ to brush $c^2$, arm-plate $d^2$, brush $c^3$ to annular plate $b^5$, out via conductor $u^5$ to coil of magnet $m^2$, thence by conductor to post $w$, and from thence through the battery and the circuit-breaker, as before. The magnet $m^3$ has its circuit from broken contact $b'$ to brush $c'$, arm-plate $d'$, brush $c^4$ to annular plate $b^6$, out via conductor $u^6$ to the coil of magnet $m^3$, and thence to post $w$ and through the battery and circuit-breaker, which always, after or during each pulsation, switches the current from that broken contact-plate last on duty to that one which has no metallic contact with its brush.

Having thus described my automatic system as applied to rudder-indicating, it will be readily understood that each of the many lines of service to which the system is adapted will only require an appropriately-inscribed dial and any suitable mechanism for positively coupling the driving-shaft of the switching organization with the movable element from which the switch-driving power is to be derived.

The operation of the switch need only require such power as would be afforded from pressure-gages, whether for steam or other fluids, and the particular form of indicator described enables reliable service with low battery-power, and hence light and comparatively inexpensive cabled conductors can be employed.

Having thus described my invention, I claim as new and desire to secure by Letters Patent—

1. In an automatic electric signaling system, the combination substantially as hereinbefore described, with a mechanically-driven shaft, and a pointer-actuating organization embodying electromagnets, armature-levers, and mechanism for operatively coupling said levers with the pointer, of a switch which is connected to and mechanically operated by said shaft, is electrically connected with the indicator, and has a main brush-arm actuated by an auxiliary arm, which carries brush-coupling contacts, is secured to said shaft, and has a restricted movement independently of the main arm, whereby according to the direction in which said shaft may be rotated, the appropriate pointer-actuating magnets will be excited.

2. In an automatic electric signaling system, the combination substantially as hereinbefore described, of a dial, and a pointer, a magneto-mechanical organization for actuating the pointer, step by step, an electric switch mechanically actuated by a mechanically-driven shaft; electric connections between said switch and the pointer organization, and an electromagnetic circuit-breaker electrically controlled by said switch, and automatically caused to cut off communication with the electric generator after each step-by-step movement of the pointer.

3. In an electric signaling system, the combination substantially as hereinbefore described, of a magneto-mechanical organization for actuating a pointer step by step; a switch electrically coupled to said organization and provided with appropriate brushes, and with a pair of switch-plates, each having contact-surfaces widely separated by insulation, and an automatic electromagnetic circuit-breaker having electric terminals coupled separately to said plates, whereby in operating the switch, the electric current is intermittingly applied for working the pointer step by step, and the circuit broken at the close of each step movement, and always kept broken while the switch is at rest in any position.

4. In an automatic circuit-breaker, for use in an automatic electric signaling system, the combination with suitable magnets, and an armature-lever serving as a switch-arm, and provided with reversely-inclined faces, of a detent or arm having similarly-inclined faces, for engaging with those on the lever, and operating as a tripping device, for mechanically moving said lever, and for confining it, except when actuated by its magnets, substantially as described.

GWYNNE ERNEST PAINTER.

Witnesses:
N. V. RASIN,
A. V. JACOBS.